H. D. JAMES.
SYSTEM OF CONTROL.
APPLICATION FILED JUNE 2, 1905.
917,868.
Patented Apr. 13, 1909.
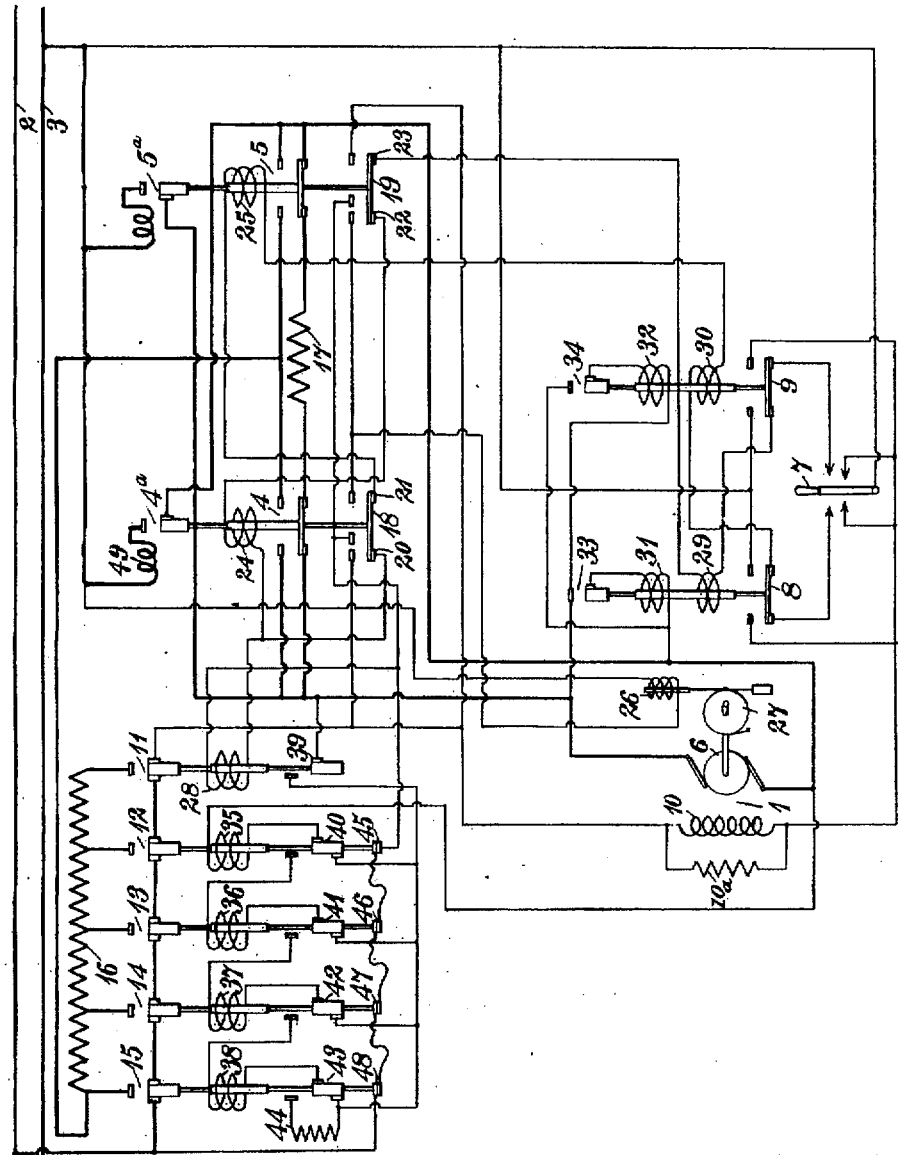
WITNESSES:
Fred. H. Miller
Otto S. Schairer.
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

No. 917,868.  Specification of Letters Patent.  Patented April 13, 1909.

Application filed June 2, 1905. Serial No. 263,475.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Control, of which the following is a specification.

My invention relates to electric systems of control, and it has for its object to provide an improved system of control for electric motors employed for elevator operation and for similar purposes.

My invention consists in providing a plurality of switches which have two circuit-closing positions, that may be designated as power and braking positions, and which establish the motor armature circuit for either forward or backward rotation, according as the one or the other occupies its power position. When both of the switches occupy their braking positions, the motor armature is connected in closed circuit with a suitable resistance and a dynamic brake is thus provided. The switches are severally provided with two-position interlocking switches which prevent closing of both switches simultaneously and which close the circuit of a magnet winding that releases the mechanical brakes.

My invention consists further in providing a relay switch corresponding to each of the direction-controlling switches, the circuits of the operating magnet windings of the relay switches being governed by a master switch. The relay switches serve to prevent simultaneous operation of both of the circuit-closing switches and are also provided with retaining magnet windings connected in shunt to the armature circuit that prevent interruption of the shunt field circuit of the motor while the armature is still revolving at an appreciable speed, and also prevent operation of the direction-controlling switches for the purpose of reversing the direction of rotation of the motors until the motor has come to rest, or nearly so.

My invention consists also in providing a novel means for removing the resistance from the motor circuit in gradations, such means comprising a plurality of main switches, the first one of which is closed when the master switch is operated and the remainder of which are closed in succession, as the counter electromotive force of the motor rises, by having their operating magnet windings connected successively in series by means of interlocking switches that are carried by the main switches. Means are also provided for preventing closing of the first main switch unless all of the other main switches are open, thereby preventing completion of the motor circuit without including all of the regulating resistance, which might occur if one or more of the main switches should not operate freely.

The single figure of the accompanying drawing illustrates a system embodying my invention.

The system comprises, as its principal elements, a motor 1 that derives energy from supply conductors 2 and 3, switches 4 and 5 that are adapted to connect armature 6 of the motor for forward and for backward rotation, respectively, a master switch 7 and relay switches 8 and 9 that are controlled by the master switch and that control the operation of the switches 4 and 5 and the circuit connections of field magnet winding 10 of motor 1, and switches 11, 12, 13, 14 and 15 for inserting a resistance 16 in the armature circuit and removing it therefrom in gradations.

When the switches 4 and 5 are in the positions shown in the drawing, which may be termed "braking positions," a resistance 17 is connected in closed circuit with the motor armature, a dynamic brake being in this manner provided for the motor. When the one or the other of the switches 4 and 5 occupies its uppermost position, the armature circuit of the motor is established for forward or for backward rotation. The switches 4 and 5 operate switches 4ᵃ and 5ᵃ that are also located in the armature circuit and are provided with interlocking switches 18 and 19, the lower contact terminals 20, 21, 22 and 23 of which are so connected to operating magnet windings 24 and 25 and to the remainder of the circuit that they may prevent simultaneous energizing of the said windings. When either of the interlocking switches 18 and 19 occupies its uppermost position, a magnet winding 26 is energized to release a brake 27 for the motor armature 6, and a circuit is also completed through operating magnet winding 28 of switch 11, independently of other circuits.

The relay switches 8 and 9 are provided, respectively, with operating magnet windings 29 and 30, the circuits of which are controlled, primarily, by the master switch 7 and, secondarily, by the operation of the relay switches themselves, the circuit connections of the operating magnet windings being so arranged that when one of the switches occupies its uppermost position, the other switch may not be operated, the same means serving also to prevent simultaneous operation of switches 4 and 5. When the relay switches 8 and 9 occupy their uppermost positions, a circuit is established through the field magnet winding 10 which is independent of that established by the master switch 7, and this circuit is maintained while the motor armature rotates at an appreciable speed, by means of retaining magnet windings 31 and 32, which are connected in shunt circuit to the motor armature by means of switches 33 and 34 that are operated by the switches 8 and 9. The retaining windings 31 and 32 serve, also, to prevent energizing of either of the operating magnet windings 24 and 25 of the switches 4 and 5 for the purpose of effecting reversal of direction of rotation of the motor until the motor has come to rest, or nearly so.

The circuit of the operating magnet winding 28 for switch 11 is controlled by the master switch 7, while the circuits of operating magnet windings 35, 36, 37 and 38 of the remaining switches 12, 13, 14 and 15 are controlled by interlocking switches 39, 40, 41 and 42 that are operated respectively by switches 11 to 14, inclusive, and that serve to connect the windings in shunt to the armature circuit. When the counter electromotive force of the motor has risen to a predetermined value, the switch 12 closes and effects operation of the interlocking switch 40, which connects operating magnet winding 36 in series with operating magnet winding 35, and when the counter electromotive force of the motor has risen to another predetermined value, the switch 13 closes and the interlocking switch 41 is also operated for the purpose of connecting the operating magnet winding of the next succeeding switch in series with those already energized, the operation continuing in a similar manner until all of the switches have been closed. The last switch 15 is provided with an interlocking switch 43 which connects a resistance 44 in series with the operating magnet windings for the purpose of reducing the amount of current that may be supplied to them after all of the switches have been closed.

The switches 12, 13, 14 and 15 are also provided with interlocking switches 45, 46, 47 and 48, respectively, which are interposed in the circuit of the operating magnet windings 24, 25 and 28 in order that they may not be energized while the switches 4 and 5 occupy their lowermost positions, provided any of the corresponding switches 12 to 15, inclusive, are closed. These interlocking switches are provided for the purpose of preventing the motor from starting with less than the whole of the resistance 16 in the armature circuit, which might otherwise occur if any of the switches should not operate readily.

If the master switch 7 is moved to the right, a circuit is established from supply conductor 3, through the master switch 7 and field magnet winding 10, to supply conductor 2, and another circuit is also established from supply conductor 3, through master switch 7, relay switch 9, operating magnet winding 29, relay switch 19, operating magnet winding 24, operating magnet winding 28, interlocking switches 45 to 48, inclusive, to supply conductor 2. The operating magnet windings 29, 24 and 28, being thus energized, effect operation of their corresponding switches and a motor circuit is thus established from supply conductor 3, through blow-out coil 49, switch 4ª, armature 6 of the motor 1, switch 4, resistance 16 and switch 11, to supply conductor 2. Closure of the switch 8 connects the field magnet winding 10 to the conductor 3 independently of the connection afforded by the master switch 7. The raising of the switch 18 establishes a circuit through the brake operating magnet winding 26 by way of the parts bearing the reference characters 3, 26, 18, 11, etc., and 2, and the brake is consequently released. The terminal of the magnet winding 28 is also connected by means of the switch 18 to the conductor 2 by way of the connections between the switches 11 to 15 inclusive, independently of the connection through the switches 45 to 48 inclusive, the latter connection being broken upon closure of the switches 12 to 15. The succeeding switches 12 to 15, inclusive, which are provided for the purpose of cutting the resistance 16 out of the armature circuit, then close successively in the order and manner already described.

When it is desired to stop the motor, the switch 7 is moved to the position shown in the drawing and the circuits of the operating magnet windings 29, 24 and 28 are thus interrupted. The switches 4 and 11 then drop to their lowermost positions, followed by the dropping of switches 12 to 15 inclusive thereby disconnecting the motor armature 6 from the supply conductors 2 and 3 and connecting it in a closed circuit with resistance 17. The circuit of the field magnet winding 10 is maintained closed by the magnet winding 31 operating on the switch 8, and the motor then operates as a generator and acts as a dynamic brake until the generated current falls below a predetermined amount. A comparatively high ohmic resistance 10ª that is connected permanently in shunt to the field magnet winding absorbs the discharge when the field circuit is interrupted. As soon as the switch 18 has fallen to its lowermost position, the circuit of the brake magnet winding 26 is interrupted and the mechanical brake is also set.

As the switch 8 is maintained in its uppermost position until the motor has come to rest, or practically so, it is impossible to establish a circuit through the operating magnet winding 25 of the switch 5 and in that manner complete the motor circuit for reverse direction of rotation, even though the master switch 7 be moved to the left of the position shown.

It will, of course, be understood that when the master switch 7 is moved to the left, the operating magnet windings of switches 9, 19 and 11 will be energized and the circuits of the motor will be established for the reverse direction of rotation in a manner similar to that above set forth, it being deemed unnecessary to trace the circuits in detail.

I claim as my invention:

1. The combination with a supply circuit and a motor, of switches for establishing the motor armature circuits for forward and backward rotation respectively, and relay switches that are actuated independently thereof and that prevent interruption of the field magnet circuit while the motor operates at greater than a predetermined speed.

2. The combination with a supply circuit and a motor, of switches for establishing the motor armature circuits for forward and backward rotation respectively, and relay switches that are actuated independently thereof having operating and retaining magnet windings, the latter of which are energized while the motor is in operation.

3. The combination with a supply circuit and a motor, of switches for establishing the motor armature circuits for forward and backward rotation respectively, and relay switches that are actuated independently thereof having operating magnet windings the circuits of which are controlled by the master switch, and retaining magnet windings that prevent the switches from returning to positions of rest while the motor operates at greater than a predetermined speed.

4. The combination with a supply circuit, a motor and a master switch, of switches for establishing the motor armature circuits for forward and backward rotation respectively, relay switches that are actuated independently thereof, and means governed thereby for preventing simultaneous operation of the relay switches.

5. The combination with a supply circuit, a motor and a master switch, of switches for establishing the motor armature circuit for forward and backward rotation respectively, relay switches that are actuated independently thereof having operating magnet windings, and means for preventing simultaneous energizing thereof.

6. The combination with a supply circuit and a motor, of switches for establishing the motor armature circuit for forward and backward rotation respectively, and means that are actuated independently thereof for preventing interruption of the field circuit of the motor while the motor is in operation.

7. The combination with a supply circuit and a motor, of switches for establishing the motor armature circuit for forward and backward rotation respectively, and means that are actuated independently thereof for preventing interruption of the field circuit of the motor and for preventing operation of the switches for the purpose of reversing the direction of rotation while the motor is in operation.

8. The combination with a supply circuit and a motor, of main switches for establishing the motor armature circuit for forward and backward rotation respectively, and corresponding relay switches that are actuated independently thereof which prevent operation of the main switches for the purpose of reversing the direction of rotation of the motor while the motor is still rotating.

9. The combination with a supply circuit and a motor, of main switches for establishing the motor armature circuit for forward and backward rotation respectively, and relay switches that are actuated independently thereof for preventing interruption of the field circuit of the motor while the motor is in operation and for preventing operation of the main switches for the purpose of reversing the direction of rotation while the motor is still rotating.

10. The combination with a supply circuit, a motor and a master switch, of switches for establishing the motor armature circuit for forward and backward rotation respectively, and relay switches that are actuated independently thereof having operating magnet windings that are controlled by the master switch and retaining magnet windings that are energized after the switches have been operated.

11. The combination with a supply circuit, a motor and a master switch, of switches for establishing the motor armature circuit for forward and backward rotation respectively, and relay switches that are actuated independently thereof having operating magnet windings that are controlled by the master switch and retaining magnet windings the circuits of which are governed by the operation of the switches and which prevent interruption of the field circuit of the motor while it is in operation.

12. The combination with a supply circuit and a motor, of a master switch, switches for arranging the motor circuits for either forward or backward rotation, operating magnet windings therefor, other switches that prevent simultaneous energizing thereof and establish a circuit for the motor field magnet winding, operating magnet windings therefor the circuits of which are controlled by a master switch, and retaining magnet windings that are connected between terminals of the motor armature while the latter revolves at greater than a predetermined speed.

In testimony whereof, I have hereunto subscribed my name this 25th day of May 1905.

HENRY D. JAMES.

Witnesses:
OTTO S. SCHAIRER,
BIRNEY HINES.